US005585901A

United States Patent [19]

Watanabe et al.

[11] Patent Number: 5,585,901

[45] Date of Patent: Dec. 17, 1996

[54] DEVELOPING MACHINE AND CARRIER CONTAINING A CHARGE-IMPARTING AGENT

[75] Inventors: Ryuji Watanabe; Katsuhiko Ichikawa, both of Suzuka; Akihisa Maruyama, Ebina, all of Japan

[73] Assignee: Fuji Xerox Co., Ltd., Tokyo, Japan

[21] Appl. No.: 395,196

[22] Filed: Feb. 27, 1995

Related U.S. Application Data

[63] Continuation of Ser. No. 77,055, Jun. 16, 1993, abandoned.

[30] Foreign Application Priority Data

Jun. 16, 1992 [JP] Japan .................................... 4-156297

[51] Int. Cl.$^6$ .......................... G03G 15/06; G03G 15/09; B32B 5/16

[52] U.S. Cl. .......................... 355/259; 355/245; 355/251; 355/253; 428/323; 428/327; 428/328; 428/906

[58] Field of Search .................................... 428/323, 327, 428/328, 906; 355/251, 253, 259, 245; 118/645, 656, 657, 658, 644

[56] References Cited

U.S. PATENT DOCUMENTS

| | | | |
|---|---|---|---|
| 2,895,847 | 7/1959 | Mayo . | |
| 3,372,675 | 8/1966 | Tressel . | |
| 3,426,730 | 2/1969 | Lawson et al. . | |
| 4,623,606 | 11/1986 | Ciccarelli | 430/110 |
| 4,743,937 | 5/1988 | Martin | 355/3 DD |
| 4,994,319 | 2/1991 | Nojima et al. | 428/906 X |
| 5,153,377 | 10/1992 | Kuwashima et al. | 118/657 |
| 5,175,070 | 12/1992 | Tanikawa et al. | 430/122 |
| 5,339,141 | 8/1994 | Suzuki et al. | 355/259 X |

FOREIGN PATENT DOCUMENTS

| | | |
|---|---|---|
| 54-51848 | 4/1979 | Japan . |
| 58-146249 | 8/1983 | Japan . |
| 100949 | 12/1983 | Japan . |
| 60-53975 | 3/1985 | Japan . |
| 63-5357 | 1/1988 | Japan . |
| 63-5358 | 1/1988 | Japan . |
| 63-5359 | 1/1988 | Japan . |
| 63-5356 | 1/1988 | Japan . |
| 63-5355 | 1/1988 | Japan . |
| 63-5353 | 1/1988 | Japan . |
| 63-5352 | 1/1988 | Japan . |
| 63-157168 | 6/1988 | Japan . |
| 63-159866 | 7/1988 | Japan . |
| 63-159867 | 7/1988 | Japan . |
| 1-142562 | 6/1989 | Japan . |
| 1-147478 | 6/1989 | Japan . |
| 1-142563 | 6/1989 | Japan . |

OTHER PUBLICATIONS

JP-64-25156, English Translation, Minamiya et al., Jan. 1989.

*Primary Examiner*—George F. Lesmes
*Assistant Examiner*—Bernard P. Codd
*Attorney, Agent, or Firm*—Oliff & Berridge

[57] ABSTRACT

A developing machine and a developer carrier therefor, for visualizing an electrostatic latent image formed on an electrostatic latent image carrier by adhesion of a developer which is carried while adhering on the surface of the developer carrier and given electric charge by triboelectricity. The developer carrier has a resin surface layer containing a charge-imparting agent selected from the group consisting of an iron complex, a basic amino acid, a polyamide fine powder, and a stearic acid salt.

19 Claims, 8 Drawing Sheets

DEVELOPING MACHINE AND CARRIER CONTAINING A CHARGE-IMPARTING AGENT

This is a continuation of application Ser. No. 08/077,055 filed Jun. 16, 1993, now abandoned.

FIELD OF THE INVENTION

This invention relates to a developing machine for visualizing an electrostatic latent image with a developer which is used in image forming equipment, such as electrophotographic copying machines and printers. More particularly, it relates to a developer carrier to be used in a one-component developing machine in which a one-component developer is made to fly in an oscillation electric field generated between a developer carrier and an electrostatic latent image carrier to visualize the electrostatic latent image.

BACKGROUND OF THE INVENTION

Various electrophotographic developing systems for visualizing an electrostatic latent image formed on a carrier have been proposed according to the type of developers used. Among them is a transfer development system which uses a developer carrier called a donor as disclosed in U.S. Pat. No. 2,895,847. The terminology "transfer development" as used in the U.S. Patent includes (1) a system in which a photoreceptor and a toner layer (developer) are placed at a gap therebetween, and the toner flies over the gap, (2) a system in which a toner layer rotates in contact with a photoreceptor, and (3) a system in which a toner layer rotates in contact with a photoreceptor while sliding on the image area. Transfer development is well known as touch-down development.

Known one-component developing machines to be used for touch-down development include those for development with a one-component magnetic developer as disclosed, e.g., in JP-A-54-51848 (the term "JP-A" as used herein means an "unexamined published Japanese patent application"), JP-A-U-58-146249 (the term "JP-A-U" as used herein means an "unexamined published Japanese utility model application"), and U.S. Pat. Nos. 3,372,675 and 3,426,730, whose schematic cross section is shown in FIG. 13, and those for development with a one-component non-magnetic developer as disclosed, e.g., JP-A-60-53975, whose schematic cross section is shown in FIG. 14.

The developing machine of FIG. 13 comprises hopper 33 for feeding one-component magnetic developer 34, cylindrical developer carrier 36 which is rotatably held by magnetic roll 35 having a plurality of magnetic poles, and developer controlling member 37. Electrostatic latent image carrier 31 (hereinafter referred to as a photoreceptor) facing to developer carrier 36 comprises an electrode having thereon a photoconductive layer, which is uniformly charged and then imagewise exposed to light to form electrostatic latent image 32. When one-component magnetic developer 34 contained in hopper 33 and supported on developer carrier 36 by the magnetic force of magnetic roll 35 passes between carrier 36 and developer controlling member 37, a film of the developer with a controlled thickness is formed, and a necessary quantity of charge is given thereto.

Developer controlling member 37 includes a member which or at least the surface of which is made of an elastic material, e.g., rubber, as shown in FIG. 13 and a magnetic or non-magnetic plate which is held to face developer carrier 36 at a given gap. Developer 34 in film form is forwarded to developing zone A where photoreceptor 31 and developer carrier 36 face to each other. A D.C./A.C. superimposed current voltage (hereinafter referred to as a superimposed current) from high-voltage A.C. power supply 38 and D.C. power supply 39 is applied to developer carrier 36, and charged developer 34 on developer carrier 36 flies to electrostatic latent image 32 on photoreceptor 31 through the oscillation electric field generated in developing zone A to thereby visualize the latent image.

The developing machine shown in FIG. 14 comprises hopper 43 containing non-magnetic one-component developer 44, developer carrier 46, developer supply roll 50 which rotates at the same peripheral speed as that of developer carrier 46 in the opposite direction, and developer controlling member 47 contacting developer carrier 46 under a prescribed contact pressure. Developer 44 supplied to developer carrier 46 by supply roll 50 is carried to developer controlling member 47 by the revolution of carrier 46, where a film of the developer with a controlled thickness is formed, and a necessary quantity of charge is given thereto. Developer 44 in film form is forwarded to developing zone A where photoreceptor 41 and developer carrier 46 face each other. A superimposed current voltage from high-voltage A.C. power supply 48 and D.C. power supply 49 is applied to developer carrier 46, and charged developer 44 on developer carrier 46 flies to electrostatic latent image 42 on photoreceptor 41 through the oscillation electric field generated in developing zone A to thereby visualize the latent image.

Developer carrier 36 or 46 in these types of developing machines is a sleeve made of aluminum or stainless steel coated with a semiconductive material, such as high-molecular weight resin, e.g., a phenolic resin or an epoxy resin, having dispersed therein a resistivity controlling agent and a reinforcement. The surface of the sleeve may be mechanically abraded by emery, etc. to have a prescribed surface roughness. A sleeve made of a semiconductive resin with its inner wall rendered conductive by coating a conducting agent, etc. and with its outer surface mechanically abraded may also be used as a developer carrier.

As developer 34 or 44 passes between developer controlling member 37 or 47 and developer carrier 36 or 46, it forms a thin layer and, at the same time, is given positive or negative electric charges according to the charging polarity of developer 34 or 44 by triboelectricity. Developer 34 or 44 is carried on the uneven surface of developer carrier 36 or 46. If the surface roughness (Rz) of developer carrier 36 or 46 is less than 0.5 μm, the amount of developer 34 or 44 carried is insufficient for obtaining a satisfactory image density. If Rz is 10 μm or greater, the excess of developer 34 or 44 carried has no contact with developer carrier 36 or 46, resulting in a failure of causing sufficient triboelectricity. Accordingly, developer carrier 36 or 46 preferably has a surface roughness Rz of from 0.5 to 10 μm.

Magnetic one-component developer 34 may be replaced with a non-magnetic one-component developer. In this case, magnetic roll 35 in developer carrier 36 is unnecessary.

In order to charge one-component developer by triboelectricity, it is effective to incorporate a triboelectricity-imparting agent into developer carrier 36 or 46. A number of triboelectricity-imparting agents to be incorporated into developer carrier 36 or 46 have been proposed to date, including metal oxide particles (JP-A-1-142563), a reaction product of a di-organotin oxide and boric acid or an organoboric acid (JP-A-63-5352), a bis(di-organotin carboxylic acid)dicarboxylic acid salt (JP-A-63-5353), a tri-organotin carboxylic acid (JP-A-63-5355), a triazine condensation product (JP-A-63-5356), a compound represented by formula $R_1NHR_2NHCNR_3$ (JP-A-63-5357), a di-organotin borate (JP-A-63-5358), a di-organotin phosphate (JP-A-63-5359), a polymer of a monomer represented by formula $CH_2CRXPR_2R_3$ or a copolymer of the monomer and a vinyl monomer (JP-A-63-157168), a triphenylmethane compound (JP-A-63-159866), a compound represented by formula $R_1R_2P(CH_2)_nPR_3R_4$ (JP-A-63-159867), metal oxide particles (JP-A-1-142562), and a silicone resin containing an aminosilane coupling agent (JP-A-1-147478).

Some of these triboelectricity-imparting agents which can be dispersed in a developer carrier achieves effects to some extent but not to a sufficient extent.

SUMMARY OF THE INVENTION

An object of the present invention is to provide a novel charge-imparting agent which is incorporated into a developer carrier to impart a sufficient quantity of triboelectric charge to a one-component developer, particularly a negatively chargeable one-component developer.

Other objects and effects of the present invention will be apparent from the following description.

The present invention relates to a developing machine for visualizing an electrostatic latent image formed on an electrostatic latent image carrier by adhesion of a developer which is carried while adhering on the surface of a developer carrier and given electric charge by triboelectricity, the developer carrier having a resin surface layer containing a charge-imparting agent selected from the group consisting of an iron complex, a basic amino acid, a polyamide fine powder, and a stearic acid salt.

The present invention also relates to a developer carrier for a developing machine for visualizing an electrostatic latent image formed on an electrostatic latent image carrier by adhesion of a developer which is carried while adhering on the surface of the developer carrier and given electric charge by triboelectricity, the developer carrier having a resin surface layer containing a charge-imparting agent selected from the group consisting of an iron complex, a basic amino acid, a polyamide fine powder, and a stearic acid salt.

DETAILED DESCRIPTION OF THE INVENTION

Figure 1:
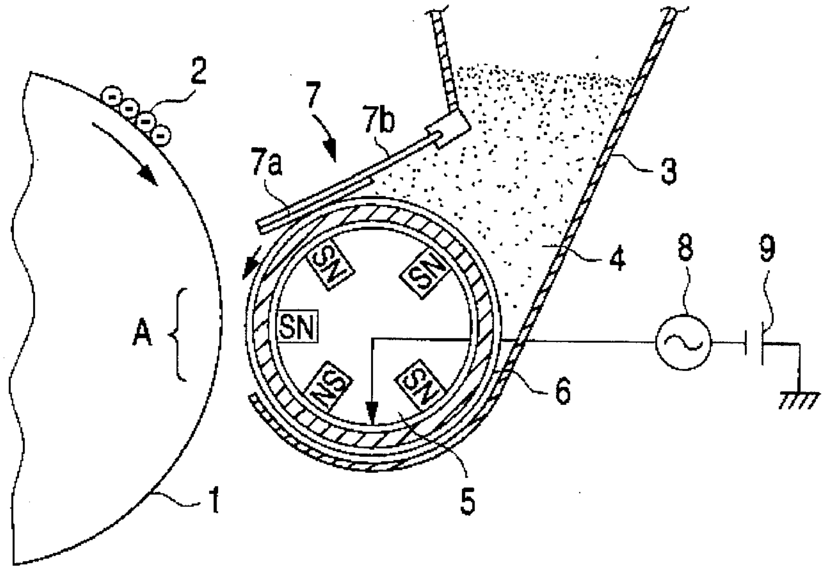
FIGS. 1(*a*), 1(*b*) and 1(*c*) are schematic cross sections of a one-component developing machine according to the present invention, in which a magnetic developer is used.
Figure 1:
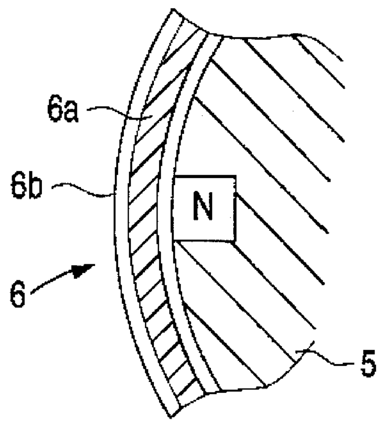
Figure 1:
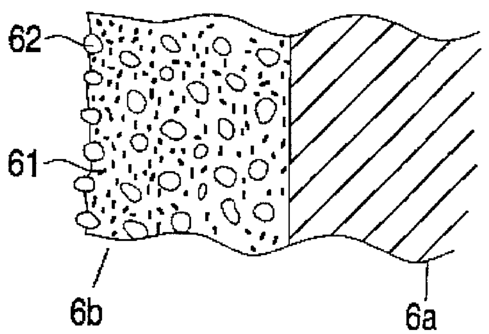

Examples of the developing machine according to the present invention include a one-component developing machine comprising a developer carrier which faces an electrostatic latent image carrier (photoreceptor) and carries a developer adhered on the surface thereof, and a developer controlling member which controls the amount of the developer adhered on the developer carrier to form a developer film on the developer carrier, in which a charged developer on the developer carrier is adhered onto an electrostatic latent image on the photoreceptor in an electric field formed in a developing zone where the developer carrier and the photoreceptor closely face each other, where the developer carrier contains in at least the surface thereof a charge-imparting agent selected from an iron complex, a basic amino acid, a polyamide fine powder, and a stearic acid salt. Examples of the complexes which can be used as a charge-imparting agent in the present invention include the compounds represented by the following formulae (I) to (VI):

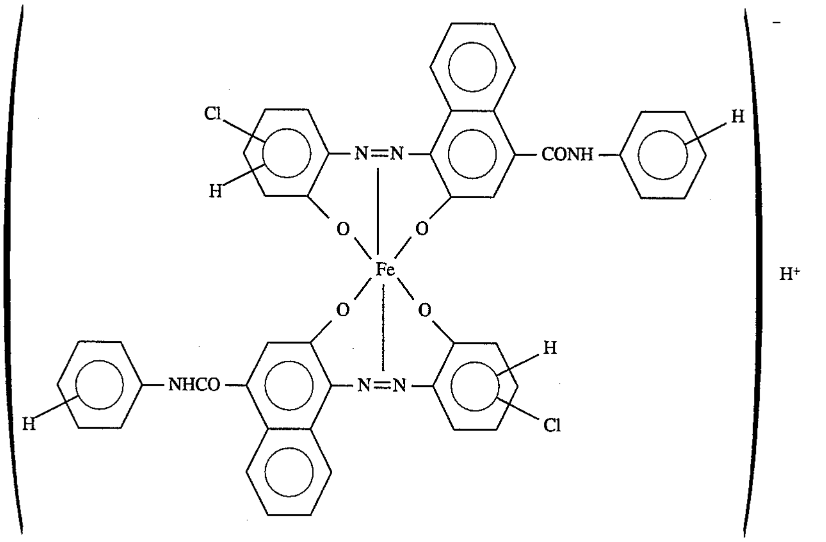
(I)
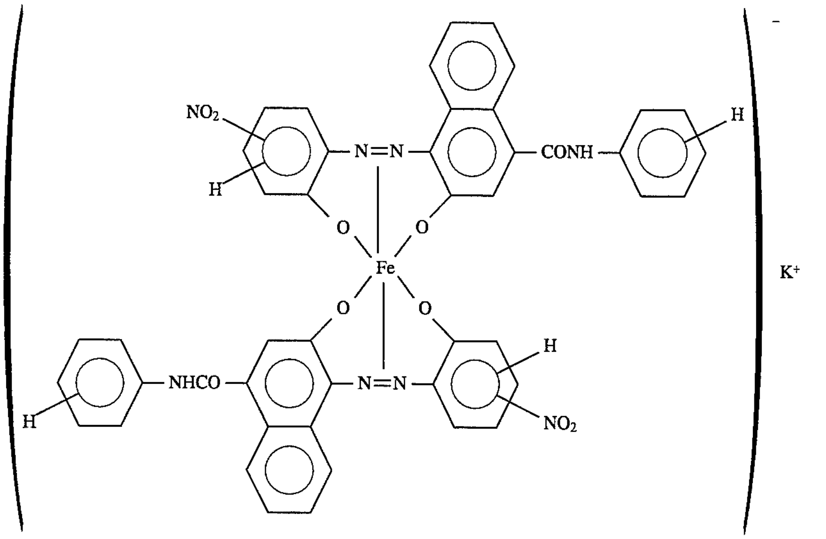
(II)
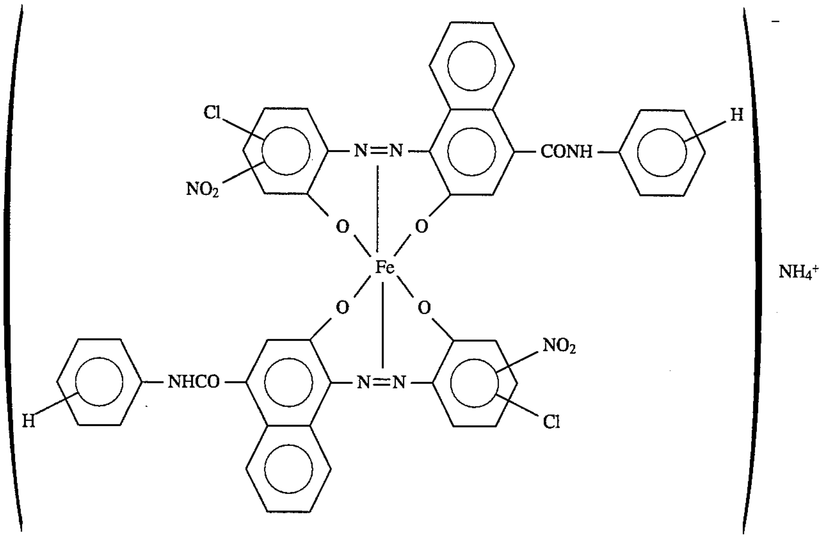
(III)

-continued
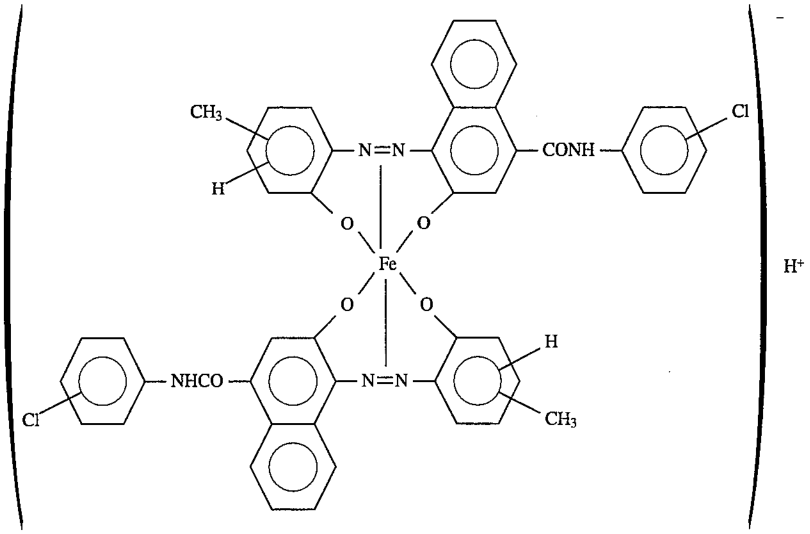
(IV)
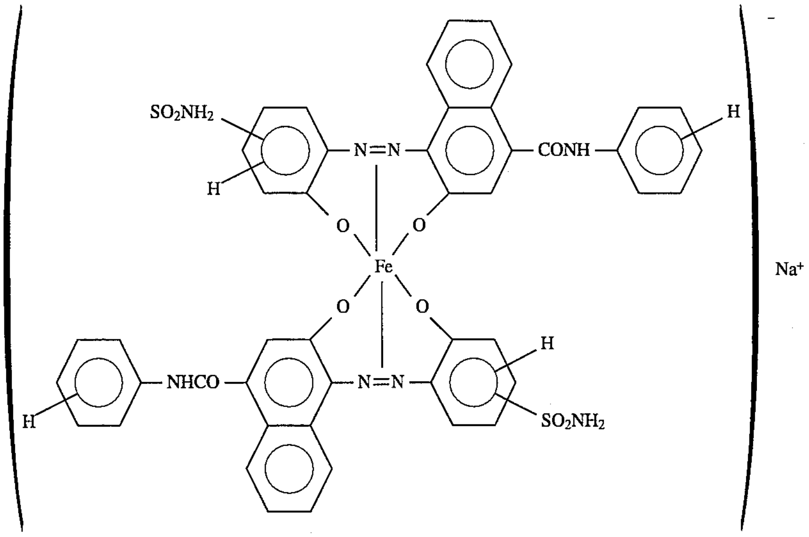
(V)
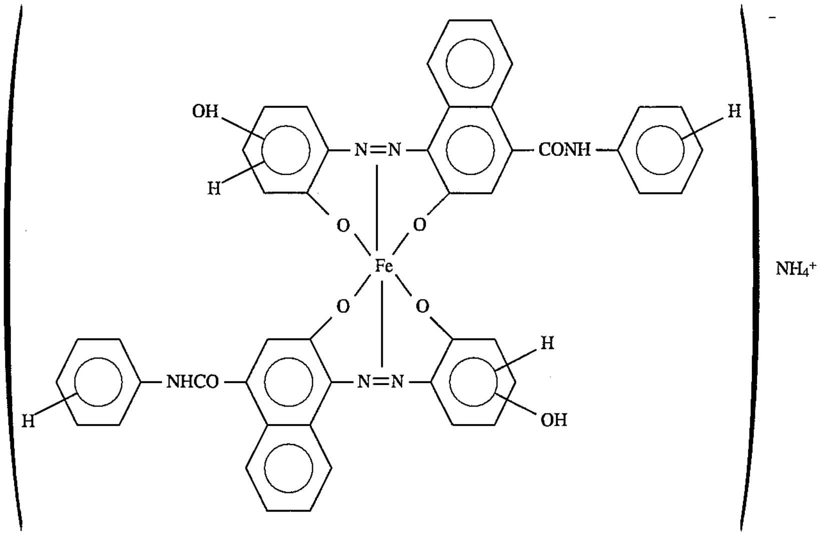
(VI)
Among the above, a compound represented by formula (I) is preferably used.
Basic amino acids, which are widely used as food additives, have not been known to have charge imparting properties. Having no toxicity, basic amino acids are free from the least danger on handling during, for example, production of a developer carrier. Examples of the basic amino acids which can be used as a charge-imparting agent in the present invention include histidine, lysine, isoleucine, leucine, tryptophane, valine, methionine, phenylalanine, cystine, alanine, and lauroyl lysine. Among the above, histidine and lauroyl lysine are preferably used.

While polyamide resins have been known to have charge imparting properties, the poor processability of polyamide has been a bar to application by, for example, electrostatic deposition. Therefore, polyamide has been used mostly as a base resin. Because polyamide is highly dependent on the environment, it is very susceptible to influences of humidity and temperature of the atmosphere when used as a base resin and is liable to undergo deterioration, especially reduction in charge imparting properties with an increase in humidity or temperature.

The present inventors have succeeded in making the best possible use of the charge imparting performance of environment-dependent polyamide by dispersing finely divided polyamide in a base resin. By incorporating polyamide fine powder into a base resin, exposure to the atmosphere on the surface of a developer carrier is minimized so that the deterioration of the polyamide due to its strong environment dependence can be reduced.

Examples of the polyamides in fine powder form include 1,2-nylon, 6-nylon, 11-nylon, 12-nylon, 46-nylon, 66-nylon, 6,10-nylon, and 6,12-nylon. Preferred of them is 1,2-nylon which is less liable to variation with environmental changes, i.e., has a small moisture absorption.

It is preferable to use a polyamide fine powder having its 50 percent particle diameter in a range of from 1 to 20 μm. Otherwise, the coated surface of a developer carrier becomes so rough that the amount of a developer carried tends to be excessive.

Examples of the stearic acid salts which can be used as a charge-imparting agent in the present invention preferably include aluminum stearate, and alkali metal salts and alkaline earth metal salts of stearic acid, such as calcium stearate, magnesium stearate, and zinc stearate. Among these, aluminum stearate and calcium stearate are preferably used.

The particle diameter of the charge-imparting agents of the present invention other than the polyamide fine powder, i.e., the iron complex, the basic amino acid and the stearic acid salt, is not particularly limited.

Examples of the binder resins in which the above-mentioned charge-imparting agent can be dispersed include epoxy resins, polyester resins, acrylic resins, phenolic resins, silicone resins, polyurethane resins, chlorinated paraffine resins, polyethylene resins, polypropylene resins, fluorine resins, rosin, polycarbonate resins, derivatives of these resins, copolymers of these resins, and mixtures thereof.

The binder resin having dispersed therein the charge-imparting agent may be coated on the surface of a cylindrical substrate at least the surface of which has conductivity, such as a substrate made of aluminum or stainless steel.

The amount of the charge-imparting agent according to the present invention is generally from 0.1 to 20 parts by weight for the iron complex, from 0.1 to 40 parts by weight for the basic amino acid, from 0.1 to 80 parts by weight for the polyamide fine powder, or from 0.1 to 40 parts by weight for the stearic acid salt, per 100 parts by weight of the binder resin, with it being preferably from 1 to 10 parts by weight for the iron complex, from 1 to 20 parts by weight for the basic amino acid, from 10 to 50 parts by weight for the polyamide fine powder, or from 1 to 20 parts by weight for the stearic acid salt, per 100 parts by weight of the binder resin.

The developer carrier according to the present invention may further contain a filler, such as an inorganic filler and a conductivity-imparting material. Examples of the inorganic filler include a metal oxide, e.g., $SiO_2$, $Al_2O_3$, $TiO_2$, ZnO and MgO, a metal carbonate, e.g., SiC and TiC, a metal nitride, e.g., $Si_3N_4$, TiN and ZrN, a metal borate, a basic oxide and the like. Examples of the conductivity-imparting material include carbon black, tin oxide, barium sulfate and the like. Among these, $SiO_2$, $Al_2O_3$, and carbon black are preferably used as the filler.

The particle diameter of the inorganic filler is generally from 0.1 to 20 μm, and preferably from 0.5 to 5 μm. The amount of the inorganic filler is generally from 10 to 200 parts by weight, and preferably from 30 to 130 parts by weight, per 100 parts by weight of the binder resin.

The particle diameter of the carbon black is generally from 1 to 150 μm, and preferably from 10 to 50 μm. The amount of the carbon black is generally from 0.1 to 50 parts by weight, and preferably from 3 to 25 parts by weight, per 100 parts by weight of the binder resin.

The particle diameter of the conductivity-imparting agents other than carbon black is generally from 0.01 to 50 μm, and preferably from 0.1 to 10 μm. The amount of the conductivity-imparting agents other than carbon black is generally from 1 to 200 parts by weight, and preferably from 10 to 150 parts by weight, per 100 parts by weight of the binder resin.

The charge-imparting agent according to the present invention can be exposed on the surface of a developer carrier so that it may give a sufficient amount of triboelectric charge, especially negative charge, to a one-component developer.

The present invention will now be illustrated in greater detail with reference to Examples, but it should be understood that the present invention is not construed as being limited thereto. All the parts are by weight unless otherwise indicated.

EXAMPLE 1

In FIGS. 1(*a*), 1(*b*) and 1(*c*) show a one-component developing machine using a magnetic developer according to one embodiment of the present invention. In this Example, an iron complex was used as a charge-imparting agent.

Photoreceptor 1 is a drum having a photoconductive surface layer comprising a negatively chargeable organic photosensitive substance. Photoreceptor 1 is uniformly charged by a charging means (not shown) and then imagewise exposed to light to form electrostatic latent image 2 thereon based on a difference in electrostatic potential. After formation of electrostatic latent image 2, the surface potential of photoreceptor 1 is, for example, 800 V on the image area and 120 V on the background (non-image area).

Developer carrier 6 is provided in the face of photoreceptor 1 and carries developer 4 adhered thereon while rotating. The gap between developer carrier 6 and photoreceptor 1 in the closest position (developing zone A) is set at about 200 μm.

Magnetic roll 5 containing a plurality of magnets aligned on the inner wall thereof is unmovably fixed inside developer carrier 6. The S pole and N pole of the plurality of magnets are so aligned along the inner wall of magnetic roll 5 to form a magnetic pattern. In conformity to this magnetic pattern, magnetic developer 4 can be attracted and adhered to the surface of developer carrier 6.

Developer controlling member 7 is composed of leaf **7*b* having adhered thereto soft elastic body 7*a* which is pressed onto the surface of developer carrier 6. The support-lug of leaf 7*b* is fixed to hopper 3. The point where soft elastic body 7*a* contacts developer carrier 6 makes an angle of 80° with a reference line connecting the point where developer carrier 6 is closest to photoreceptor 1 and the center of magnetic roll 5 to the upstream slide of the rotation direction of developer carrier 6. The free end of leaf 7*b* faces downstream in the rotation direction of developer carrier 6. Soft elastic body 7*a* is a piece of silicone rubber having a width of 15 mm, a thickness of 1.00 mm, and a rubber hardness of 50°. Leaf 7*b*** is a 0.1 mm thick stainless steel plate (SUS 304 CSP ¾; tensile strength: 95 kgf/$mm^2$; offset yield strength: 68 kgf/$mm^2$).

Hopper 3 is a container for magnetic one-component developer 4 which is to be fed to developer carrier 6. Developer carrier 6 is substantially fit into hopper 3, with part of its surface being exposed from an opening of hopper 3 provided in developing zone A so that developer carrier 6 thus exposed and photoreceptor 1 closely face each other.

FIG. 1(*b*) shows the structure of the surface of developer carrier 6, and FIG. 1(*c*) is an enlarged cross section of resin layer **6*b*. As shown in FIG. 1**(*b*), developer carrier 6 is composed of substrate **6*a* having a thickness of 0.7 mm (aluminum cylinder) having coated thereon resin layer 6*b* comprising a semiconductive resin and having a thickness of 110 μm. As shown in FIG. 1**(*c*), resin layer **6*b* contains Fe complex 61 and, in addition, filler 62 for increasing strength and abrasion resistance of resin layer 6*b***.

In Example 1, resin layer **6*b* was formed by coating substrate 6*a*** with a coating composition prepared by dispersing 6 parts of an iron complex represented by formula (I) and 10 parts of aluminum oxide particles having a 50 percent particle diameter of 4 μm in 100 parts of a resin mixture of a polyester resin ("Beckolite M6401-50S" produced by Dainippon Ink and Cemicals Inc.), a melamine resin ("U-Van 80S" produced by Mitsui Toatsu Chemicals Inc.), and an epoxy resin ("Ep-5100-75X" produced by Asahi Denka Kogyo K.K.). The resulting resin layer had a resistivity of from $3\times10^6$ Ω·cm to $1.2\times10^7$ Ω·cm and an average surface roughness Rz of from 2.0 to 2.5 μm as measured according to JIS (average surface roughness of 10 points).

A superimposed current voltage (grid bias) from high-voltage A.C. power supply 8 and D.C. power supply 9 is applied to substrate **6*a* of developer carrier 6 to thereby produce an alternating field with a grounded electrode provided under the photosensitive layer of photoreceptor 1 in developing zone A where developer carrier 6 and photoreceptor 1** are close to each other. The bias voltage applied comprises, for example, an A.C. component of 2.4 kHz, a peak-to-peak voltage of 2,000 V, and a D.C. component of 200 V.

Negatively chargeable magnetic one-component developer 4 was filled in hopper 3, and the developing machine was mounted on a laser printer ("Fuji Xerox 4105" manufactured by Fuji Xerox Co., Ltd.). In carrying out development of electrostatic latent image 2 on photoreceptor 1, developer 4 in hopper 3 is adsorbed on the surface of rotating developer carrier 6 and rubbed by resin layer **6*b* of soft elastic body 7*a* of developer controlling member 7 whereby developer 4** is made into a thin film and, at the same time, charged by triboelectricity.

Developer 4 in film form is carried to developing zone A by the rotation of developer carrier 6 where an alternating field has been generated. A number of developer particles having a sufficient quantity of charge fly back and forth in the alternating field while colliding with each other to make a cloud of developer particles. The developer cloud is attracted to latent image 2 on photoreceptor 1 by the D.C. component of the bias voltage to complete development.

Figure 3:
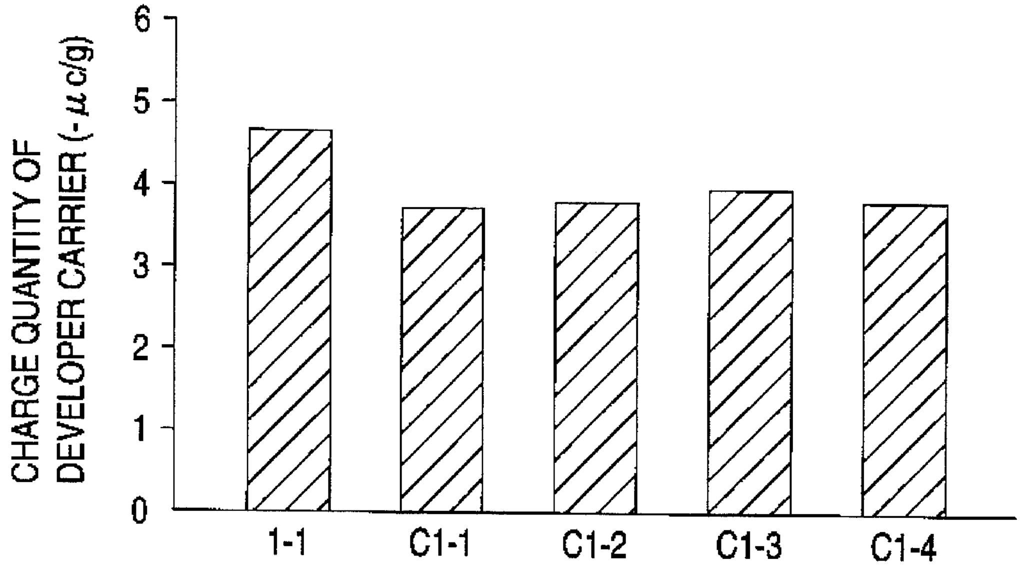
FIG. 3 is a graph showing the quantity of charge of the developer carrier prepared in Example 1 which contains an iron complex as a charge-imparting agent in comparison with that of the comparative samples.

The quantity of charge of developer carrier 6 having Fe complex-containing resin layer **6*b* (Sample 1-1) is shown in FIG. 3 in comparison with those of comparative samples (Samples C1-1 to C1-4) according to the conventional technique whose resin layer 6*b* comprised the same resin mixture as used in Sample 1-1. Resin layer 6*b* of Sample C1-1 contained no charge-imparting agent. Resin layer 6*b*** of Samples C1-2, C1-3 or C1-4 contained, as a charge-imparting agent, 5 to 7 parts of a chromium compound ("T-2" produced by Nippon Kayaku Co., Ltd.), a cobalt compound ("KAYASET YELLOW K-CL" produced by Nippon Kayaku Co., Ltd.) or an organic compound ("N-1" produced by Nippon Kayaku co., Ltd.), respectively, per 100 parts of the resin mixture.

As is shown in FIG. 3, the Fe complex according to the present invention sufficiently satisfies the practically demanded level of charge quantity, i.e., 4±1 μC/g.

Figure 4:
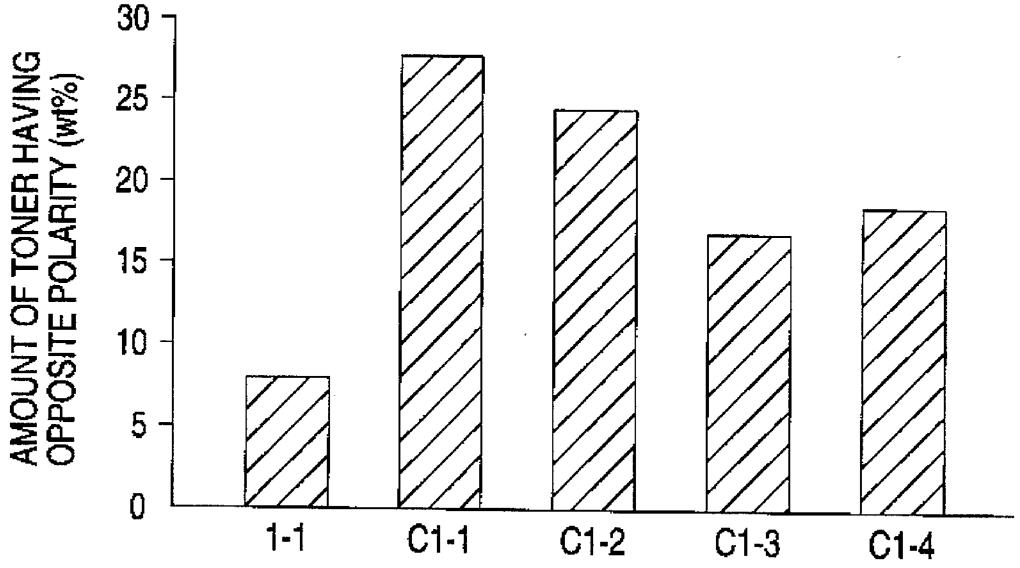
FIG. 4 is a graph showing the ratio of a toner of opposite polarity on the developer carrier prepared in Example 1 which contains an iron complex as a charge-imparting agent in comparison with that of the comparative samples.

In FIG. 4 is shown a ratio of a toner having opposite polarity (a ratio of the amount of toner particles having polarity opposite to the purposed polarity to the amount of toner particles having the purposed polarity; hereinafter referred to as opposite polarity toner ratio) in Sample 1-1 in comparison with those of Samples C1-1 to C1-4. It is seen that the opposite polarity toner ratio of Sample 1-1 is markedly lower than those of Samples C1-1 to C1-4.

The developing machine of using Sample 1-1 provided a markedly clear image, and the image quality did not change even after printing 200,000 copies.

EXAMPLE 2

Figure 2:
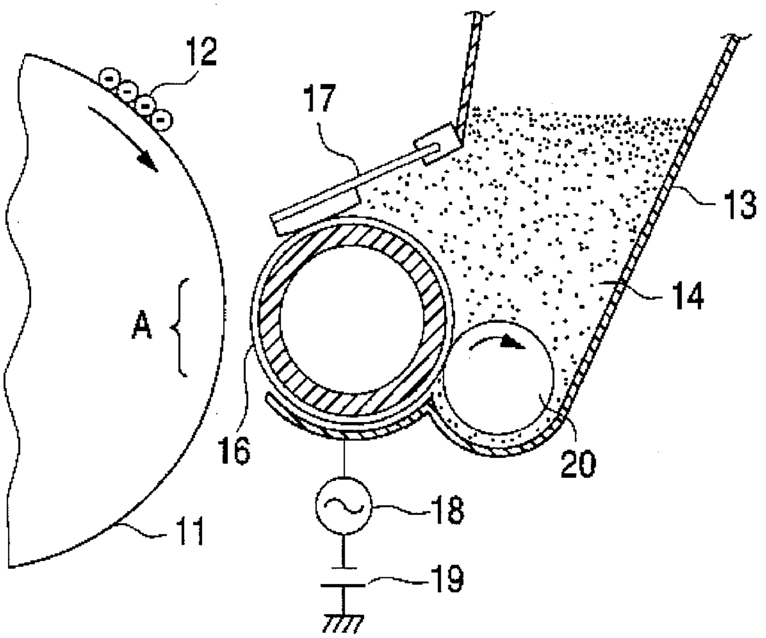
FIGS. 2(*a*) and 2(*b*) are schematic cross sections of a one-component developing machine according to the present invention, in which a non-magnetic developer is used.
Figure 2B:
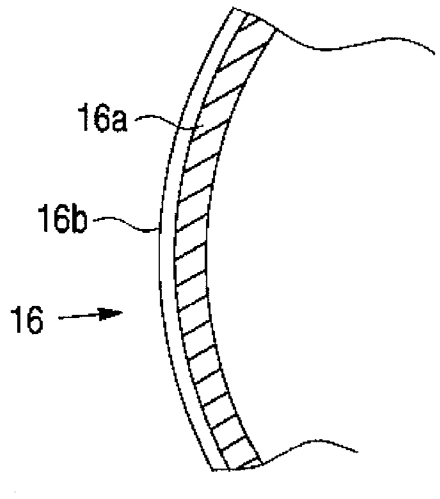

The same Fe complex as used in Example 1 was used as a charge-imparting agent for a developer carrier of a one-component developing machine having a cross section shown in FIGS. 2(*a*) and 2(*b*) in which a non-magnetic developer is used.

The developing machine has the same construction as the developing machine of FIGS. 1(*a*), 1(*b*) and 1(*c*) except that developer carrier 16 has no magnetic roll therein and, instead, developer supply roll 20 for supplying developer 14 in hopper 13 to developer carrier 16 is provided in hopper 13.

Hopper 13 filled with a negatively chargeable non-magnetic one-component developer was mounted on a laser printer (Fuji Xerox 4105), and a bias voltage (frequency of A.C. component: 3 kHz; peak-to-peak voltage: 2,200 V; D.C. component: 200 V) was applied to the aluminum cylinder to develop electrostatic latent image 12. The resulting image was as clear as that obtained in Sample 1-1 of Example 1. The quantity of charge and opposite polarity toner ratio of the developer carrier were equal to those obtained in Sample 1-1 of Example 1.

EXAMPLE 3

A basic amino acid was used as a charge-imparting agent for a developer carrier of a one-component developing machine of FIGS. 1(*a*), 1(*b*) and 1(*c*). Resin layer **6*b* on substrate 6a was formed by coating a coating composition prepared by dispersing 6 parts of histidine and 10 parts of aluminum oxide particles having a 50** percent particle diameter of 4 μm in 100 parts of a resin mixture of an acrylic resin ("ACRYDIC 54-172-60", produced by Dainippon Ink Co., Ltd.), a melamine resin ("SUPER BACKAMINE G821-60" produced by Dainippon Ink Co., Ltd.), and an epoxy resin ("EPICLON 1050" produced by Dainippon Ink Co., Ltd.). The resulting resin layer had a resistivity of from $3\times10^6$ Ω·cm to $1.2\times10^7$Ω·cm and an average surface roughness Rz of from 2.0 to 2.5 μm as measured in the same manner as in Example 1.

Figure 5:
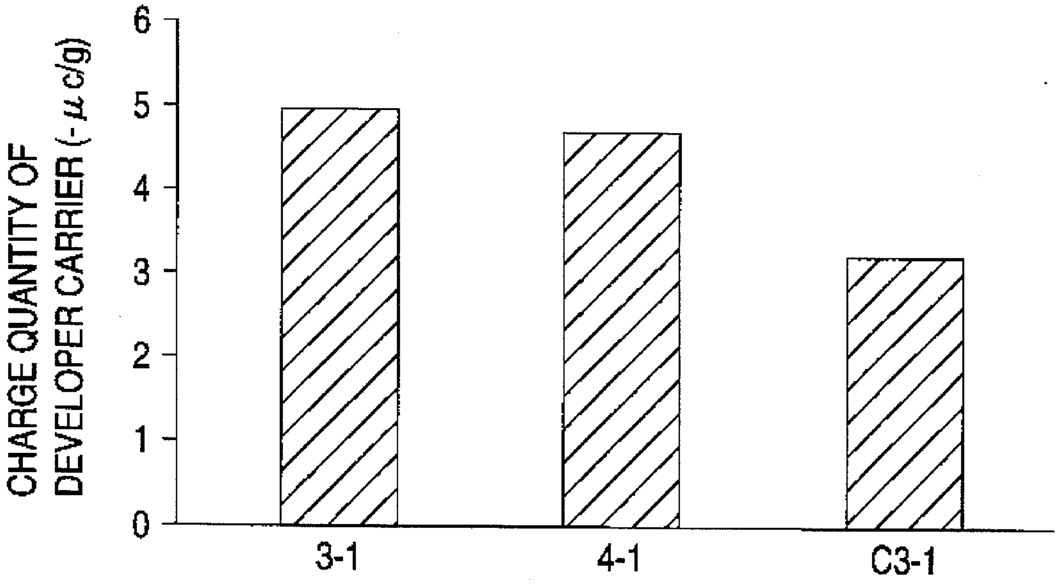
FIG. 5 is a graph showing the quantity of charge of the developer carriers prepared in Examples 3 and 4 which contains a basic amino acid as a charge-imparting agent in comparison with that of the comparative sample.
Figure 6:
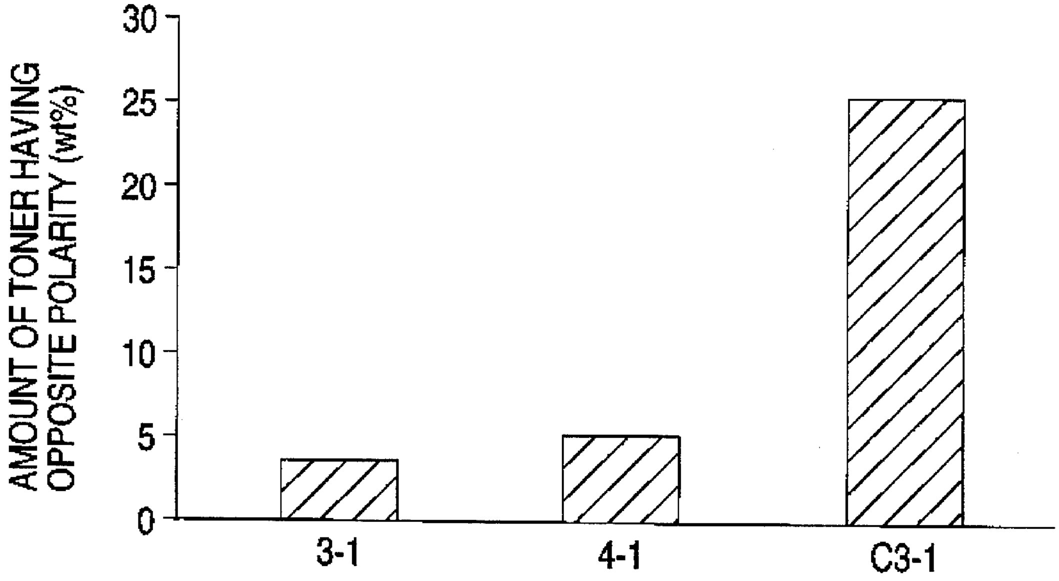
FIG. 6 is a graph showing the ratio of a toner of opposite polarity on the developer carriers prepared in Examples 3 and 4 which contains a basic amino acid as a charge-imparting agent in comparison with that of the comparative sample.

The quantity of charge and opposite polarity toner ratio of the developer carrier (Sample 3-1) are shown in FIGS. 5 and 6, respectively, in comparison with those of a comparative sample (Sample C3-1) in which resin layer 6b comprised the same resin mixture as used above but contained no charge-imparting agent.

FIG. 6 indicates that the opposite polarity toner ratio of Sample 3-1 is markedly lower than that of Sample C3-1.

The printed image thus obtained was as clear as in Sample 1-1 of Example 1.

EXAMPLE 4

A basic amino acid was used as a charge-imparting agent for a developer carrier of a one-component developing machine of FIGS. 2(*a*) and 2(*b*). Resin layer 6b on substrate 6a was formed in the same manner as in Example 3, except for replacing histidine with lauroyl lysine.

The charge quantity and opposite polarity toner ratio of the developer carrier (Sample 4-1) were equal to those obtained in Sample 3-1 of Example 3 . The printed image thus obtained was as clear as in Sample 3-1 of Example 3.

EXAMPLE 5

A polyamide fine powder was used as a charge-imparting agent for a developer carrier of a one-component developing machine of FIGS. 1(*a*), 1(*b*) and 1(*c*). Resin layer 6b on substrate 6a was formed by coating a coating composition prepared by dispersing 6 parts of 1,2-nylon fine powder having a 50 percent particle diameter of 0.5 μm and 10 parts of aluminum oxide particles having a 50 percent particle diameter of 4 μm in 100 parts of a resin mixture of an acrylic resin (ACRYDIC 54-172-60), a melamine resin (SUPER BACKAMINE G821-60), and an epoxy resin (EPICLON 1050). The resulting resin layer had a resistivity of from $3\times10^6$ Ω·cm to $1.2\times10^7$ Ω·cm and an average surface roughness Rz of from 2.0 to 2.5 μm as measured in the same manner as in Example 1.

Figure 7:
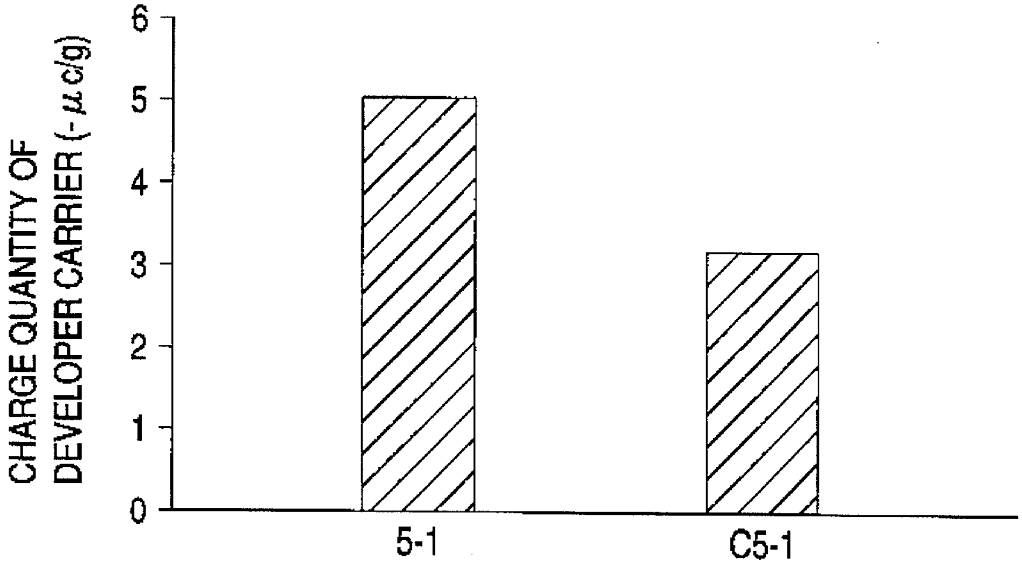
FIG. 7 is a graph showing the quantity of charge of the developer carrier prepared in Example 5 which contains a polyamide fine powder as a charge-imparting agent in comparison with that of the comparative sample.
Figure 8:
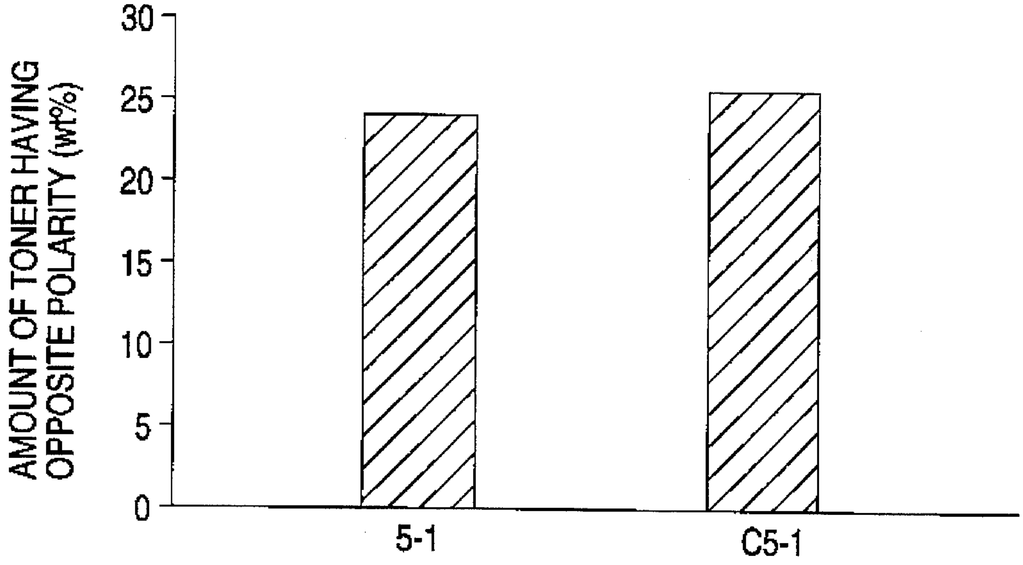
FIG. 8 is a graph showing the ratio of a toner of opposite polarity on the developer carrier prepared in Example 5 which contains a polyamide fine powder as a charge-imparting agent in comparison with that of the comparative sample.

The quantity of charge and opposite polarity toner ratio of the developer carrier (Sample 5-1) are shown in FIGS. 7 and 8, respectively, in comparison with those of a comparative sample (Sample C5-1) in which resin layer 6b solely comprised a phenolic resin (product of Tokai Rubber Industries, Ltd.). It can be seen that the polyamide fine powder according to the present invention sufficiently satisfies the practically demanded level of charge quantity, i.e., 4±1 μC/g and that the opposite polarity toner ratio is also satisfactory.

The printed image thus obtained was as clear as in Sample 1-1 of Example 1.

EXAMPLE 6

1,2-Nylon fine powder was used as a charge-imparting agent for a developer carrier of a one-component developing machine of FIGS. 2(*a*) and 2(*b*). Resin layer 6b on substrate 6a had the same composition as in Sample 5-1 of Example 5.

The charge quantity and opposite polarity toner ratio of the developer carrier were equal to those obtained in Sample 5-1of Example 5. The printed image thus obtained was as clear as in Sample 5-1 of Example 5.

EXAMPLE 7

Aluminum stearate was used as a charge-imparting agent for a developer carrier of a one-component developing machine of FIGS. 1(*a*), 1(*b*) and 1(*c*). Resin layer 6b on substrate 6a was formed by coating a coating composition prepared by dispersing 6 parts of aluminum stearate having a 50 percent particle diameter of 0.5 μm and 10 parts of aluminum oxide particles having a 50 percent particle diameter of 4 μm in 100 parts of a resin mixture of an acrylic resin (ACRYDIC 54-172-60), a melamine resin (SUPER BACKAMINE G821-60), and an epoxy resin (EPICLON 1050). The resulting resin layer had a resistivity of from $4\times10^6$ Ω·cm to $1.0\times10^7$ Ω·cm and an average surface roughness Rz of from 2.0 to 2.5 μm as measured in the same manner as in Example 1.

Figure 9:
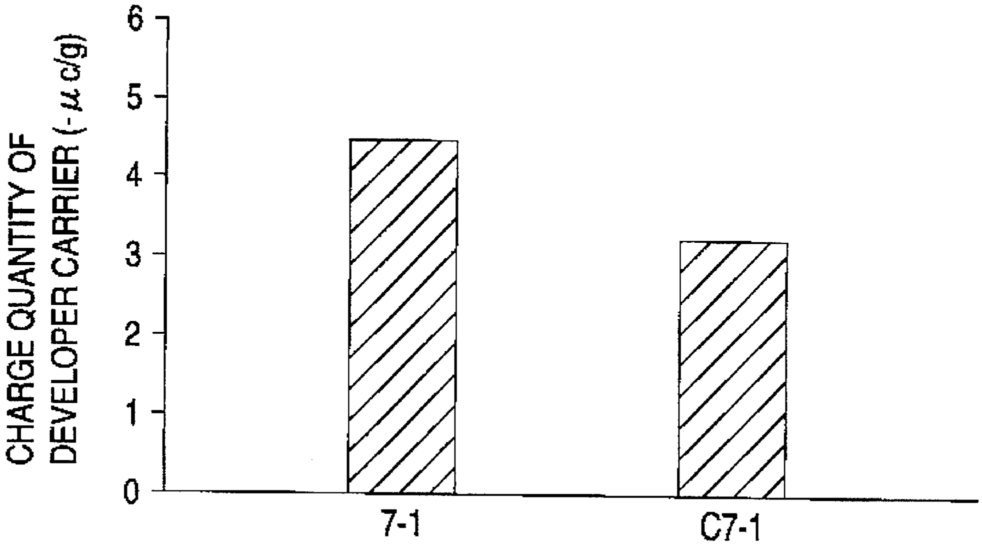
FIG. 9 is a graph showing the quantity of charge of the developer carrier prepared in Example 7 which contains aluminum stearate as a charge-imparting agent in comparison with that of the comparative sample.
Figure 10:
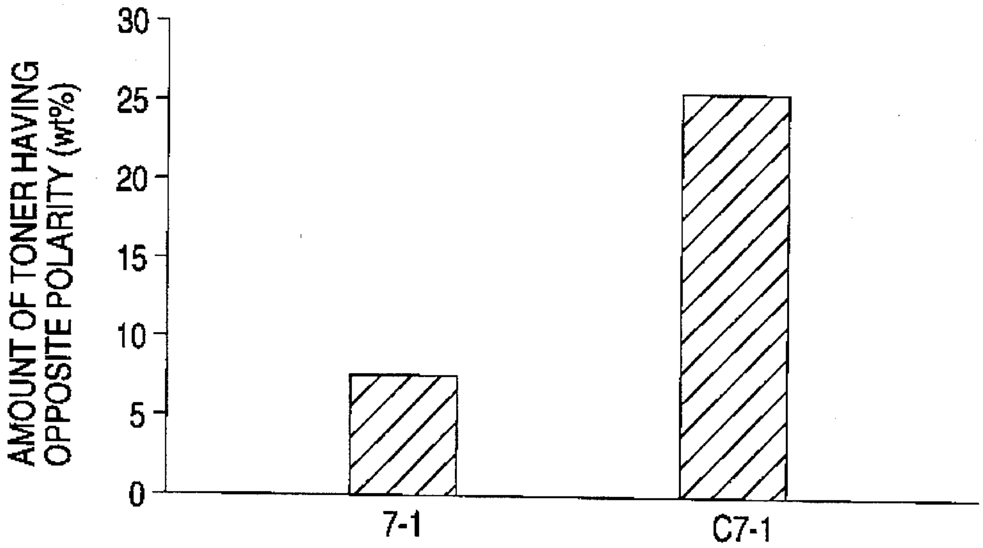
FIG. 10 is a graph showing the ratio of a toner of opposite polarity on the developer carrier prepared in Example 7 which contains aluminum stearate as a charge-imparting agent in comparison with that of the comparative sample.

The quantity of charge and opposite polarity toner ratio of the developer carrier (Sample 7-1) are shown in FIGS. 9 and 10, respectively, in comparison with those of a comparative sample (Sample C7-1) in which resin layer 6b comprised the same resin mixture as used above but contained no charge-imparting agent. It can be seen from FIG. 10 that the opposite polarity toner ratio of Sample C7-1 is markedly lower than that of Sample C7-1.

The printed image thus obtained was as clear as in Sample 1-1 of Example 1.

EXAMPLE 8

Calcium stearate was used as a charge-imparting agent for a developer carrier of a one-component developing machine of FIGS. 1(*a*), 1(*b*) and 1(*c*). Resin layer 6b on substrate 6a was formed by coating a coating composition prepared by dispersing 5 parts of calcium stearate having a 50 percent particle diameter of 0.5 μm and 6 parts of aluminum oxide particles having a 50 percent particle diameter of 6 μm in 100 parts of a resin mixture of a polyester resin (Beckolite M6401-50S), a melamine resin (U-Van 80S), and an epoxy resin (Ep-5100-75X). The resulting resin layer had a resistivity of from $8.0\times10^6$ Ω·cm to $1.8\times10^7$ Ω·cm and an average surface roughness Rz of from 2.2 to 2.6 μm as measured in the same manner as in Example 1.

Figure 11:
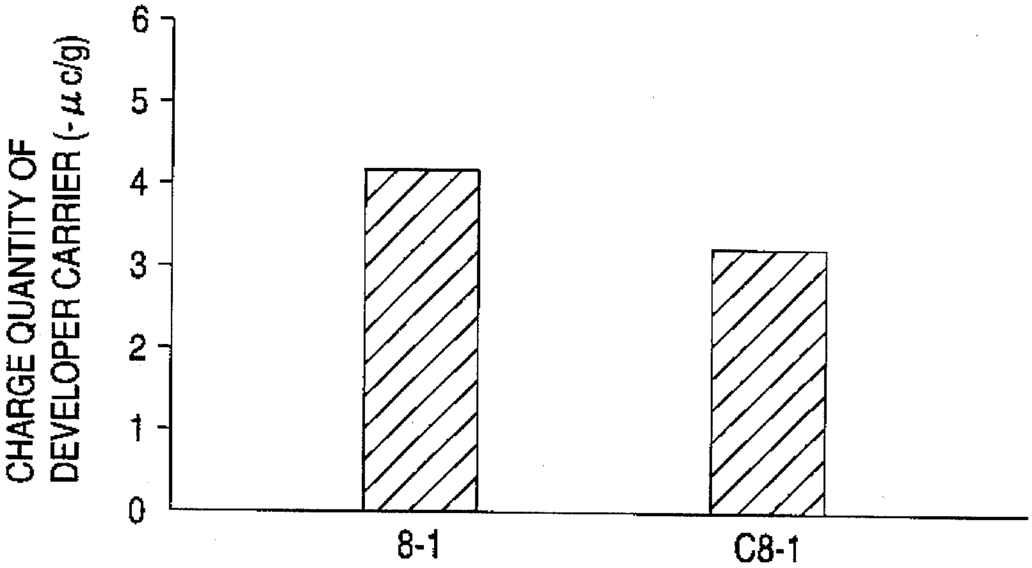
FIG. 11 is a graph showing the quantity of charge of the developer carrier prepared in Example 10 which contains calcium stearate as a charge-imparting agent in comparison with that of the comparative sample.
Figure 12:
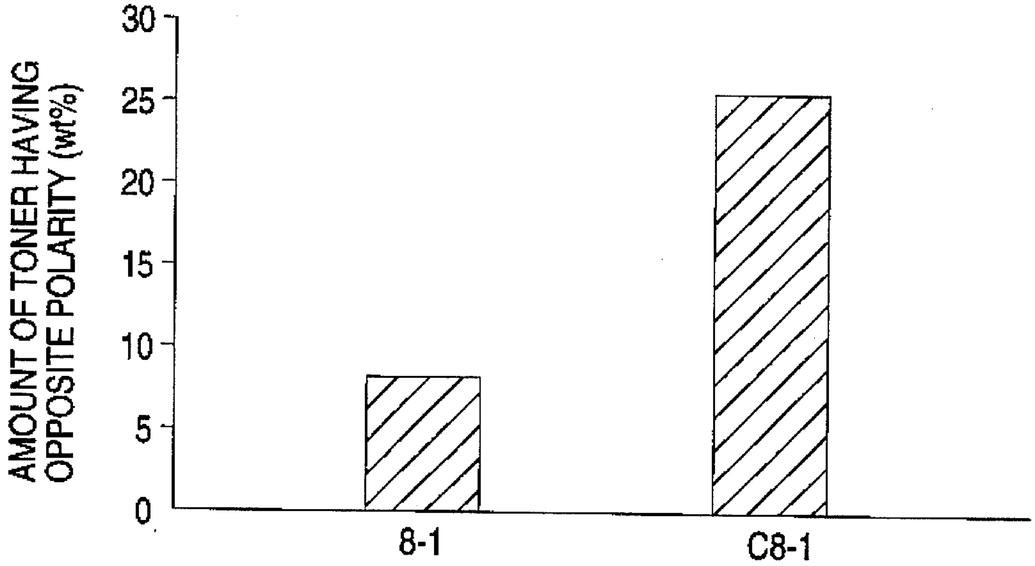
FIG. 12 is a graph showing the ratio of a toner of opposite polarity on the developer carrier prepared in Example 10 which contains calcium stearate as a charge-imparting agent in comparison with that of the comparative sample.
Figure 13:
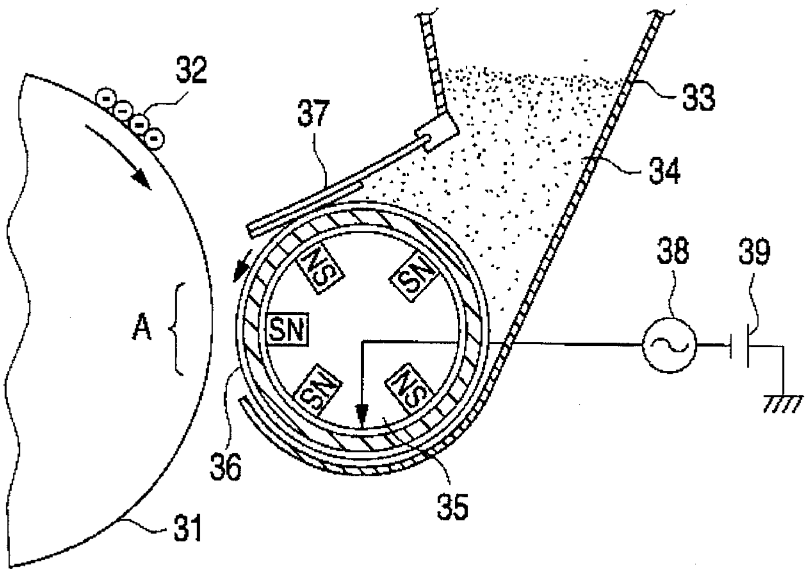
FIG. 13 PRIOR ART
FIG. 13 is a schematic cross section of a conventional one-component developing machine, in which a magnetic developer is used.
Figure 14:
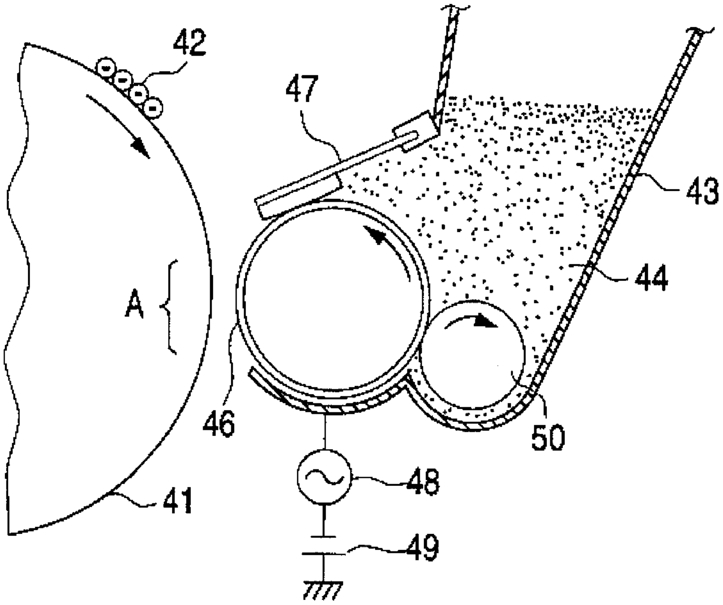
FIG. 14 PRIOR ART
FIG. 14 is a schematic cross section of a conventional one-component developing machine, in which a non-magnetic developer is used.

The quantity of charge and opposite polarity toner ratio of the developer carrier (Sample 8-1) are shown in FIGS. 11 and 12, respectively, in comparison with those of a comparative sample (Sample C8-1) in which resin layer 6b comprised the same resin mixture as used above but contained no charge-imparting agent.

The printed image thus obtained was as clear as in Sample 1-1 of Example 1.

EXAMPLE 9

Aluminum stearate was used as a charge-imparting agent for a developer carrier of a one-component developing machine of FIGS. 2(*a*) and 2(*b*). Resin layer 6b on substrate 6a had the same composition as in Example 7.

The opposite polarity toner ratio of the developer carrier was equal to that obtained in Sample 7-1 of Example 7. The printed image thus obtained was as clear as in Sample 1-1 of Example 1.

EXAMPLE 10

Calcium stearate was used as a charge-imparting agent for a developer carrier of a one-component developing machine of FIGS. 2(*a*) and 2(*b*). Resin layer 6*b* on substrate 6*a* had the same composition as in Example 7.

The opposite polarity toner ratio of the developer carrier was equal to that obtained in Sample 7-1 of Example 7. The printed image thus obtained was as clear as in Sample 1-1 of Example 1.

As described and demonstrated above, the developer carrier of the present invention, on the surface of which the specific charge-imparting agent is exposed, effectively causes triboelectricity through contact friction between the charge-imparting agent and a one-component developer to afford a greatly increased quantity of charge to the developer as compared with a developer carrier containing no charge-imparting agent.

A developer having a sufficient quantity of charge acts in good conformity to the alternating field generated in a developing zone where a developer carrier and a photoreceptor closely face each other to achieve markedly clear development. Accordingly, a clear image can be obtained in a stable manner by applying the developer carrier having the above-mentioned construction to an electrophotographic copying machine or printer.

While the invention has been described in detail and with reference to specific examples thereof, it will be apparent to one skilled in the art that various changes and modifications can be made therein without departing from the spirit and scope thereof.

What is claimed is:

1. A developing machine for visualizing an electrostatic latent image formed on an electrostatic latent image carrier by adhesion of a developer which is carried while adhering on a surface layer of a developer carrier and given electric charge by triboelectricity, said developer carrier having fixedly coated thereon a resin surface layer consisting essentially of a binder resin, a filler and a charge-imparting agent mixed with and dispersed in said binder resin, said charge-imparting agent selected from the group consisting of a basic amino acid and a polyamide fine powder, wherein said resin surface layer of said developer carrier is capable of carrying developer adhered thereto.

2. A developing machine as claimed in claim 1, wherein said polyamide fine powder has a 50 percent particle diameter of from 1 to 20 μm.

3. A developing machine as claimed in claim 1, wherein said basic amino acid is selected from the group consisting of histidine and lauroyl lysine.

4. A developing machine as claimed in claim 1, wherein said charge imparting agent is a basic amino acid.

5. A developing machine as claimed in claim 1, wherein said charge imparting agent is a polyamide fine powder.

6. A developer carrier for a developing machine for visualizing an electrostatic latent image formed on an electrostatic latent image carrier by adhesion of a developer which is carried while adhering on a surface layer of said developer carrier and given electric charge by triboelectricity, said developer carrier having fixedly coated thereon a resin surface layer consisting essentially of a binder resin, a filler and a charge-imparting agent mixed with and dispersed in said binder resin, said charge-imparting agent selected from the group consisting of a basic amino acid and a polyamide fine powder, wherein said resin surface layer of said developer carrier is capable of carrying developer adhered thereto.

7. A developer carrier as claimed in claim 6, wherein said polyamide fine powder has a 50 percent particle diameter of from 1 to 20 μm.

8. A developer carrier as claimed in claim 6, wherein said basic amino acid is selected from the group consisting of histidine and lauroyl lysine.

9. A developer carrier as claimed in claim 6, wherein said charge imparting agent is a basic amino acid.

10. A developer carrier as claimed in claim 6, wherein said charge imparting agent is a polyamide fine powder.

11. A developer carrier as claimed in claim 6, wherein said filler is an inorganic filler.

12. A developer carrier as claimed in claim 11, wherein said inorganic filler has a particle diameter of from 0.1 to 20 μm.

13. A developer carrier as claimed in claim 11, wherein said inorganic filler is contained in an amount of from 10 to 200 parts by weight per 100 parts by weight of said binder resin.

14. A developer carrier as claimed in claim 6, wherein said filler is a conductivity-imparting filler.

15. A developer carrier as claimed in claim 14, wherein said conductivity-imparting filler has a particle diameter of from 0.01 to 50 μm.

16. A developer carrier as claimed in claim 14, wherein said conductivity-imparting filler is contained in an amount of from 1 to 200 parts by weight per 100 parts by weight of said binder resin.

17. A developer carrier as claimed in claim 14, wherein said conductivity-imparting filler is carbon black.

18. A developer carrier as claimed in claim 17, wherein said carbon black has a particle diameter of from 1 to 150 μm.

19. A developer carrier as claimed in claim 17, wherein said carbon black is contained in an amount of from 0.1 to 50 parts by weight per 100 parts by weight of said binder resin.

* * * * *